United States Patent [19]
Barritz

[11] Patent Number: 5,499,340
[45] Date of Patent: Mar. 12, 1996

[54] METHOD AND APPARATUS FOR COMPUTER PROGRAM USAGE MONITORING

[75] Inventor: Robert Barritz, New York, N.Y.

[73] Assignee: Isogon Corporation, New York, N.Y.

[21] Appl. No.: 180,218

[22] Filed: Jan. 12, 1994

[51] Int. Cl.[6] .................................................. G06F 11/34
[52] U.S. Cl. .................. 395/184.01; 364/550; 364/579; 364/DIG. 1; 364/264; 364/DIG. 2; 364/920
[58] Field of Search ............................. 364/464.01, 550, 364/579, 580; 395/575, 184.01, 180

[56] References Cited

U.S. PATENT DOCUMENTS

| | | | |
|---|---|---|---|
| 2,883,255 | 4/1959 | Anderson | 395/575 X |
| 3,351,910 | 11/1967 | Miller et al. | 395/575 |
| 3,540,003 | 11/1970 | Murphy | 395/575 |
| 3,906,454 | 9/1975 | Martin | 395/575 |
| 4,740,890 | 4/1988 | William | 395/575 |
| 4,821,178 | 4/1989 | Levin et al. | 395/575 |
| 4,858,152 | 8/1989 | Estes | 364/550 |
| 5,386,369 | 1/1995 | Christiano | 364/464.01 |
| 5,446,680 | 8/1995 | Sekiya et al. | 364/550 |
| 5,446,878 | 8/1995 | Royal | 395/180 |

*Primary Examiner*—Edward R. Cosimano
*Attorney, Agent, or Firm*—Ostrolenk, Faber, Gerb & Soffen

[57] ABSTRACT

A method and apparatus for monitoring events relating to executable program modules, for example, the usage of computer programs, and automatically recording each monitored event. The system is provided with a knowledge/data base of information relating module names and the products associated with those modules. A surveying component surveys the storage devices and records a list of modules names stored on the storage device in a system configuration log. The surveying component also, based in part upon the information in the knowledge base, records associations between each module and the product it is associated with. A monitoring component monitors events, e.g. invocations, of program modules, recording these events in a event log. Finally, a reporting component correlates these log files and produces an output report correlating the monitored events and the products stored on the storage device.

18 Claims, 6 Drawing Sheets

METHOD AND APPARATUS FOR COMPUTER PROGRAM USAGE MONITORING

BACKGROUND OF THE INVENTION

1. Field of the Invention

The present invention relates to a method and apparatus for monitoring the use of computer programs and more particularly monitoring frequency of use of a variety of computer programs and software products.

2. Related Prior Art

Much of the software used on mainframe computers, minicomputers, work stations, and personal computers consists of proprietary software licensed from software vendors. Like book publishers, many software vendors retain the copyright on their products, and a software product license usually restricts the licensee's use of the product in several ways.

Software products are usually obtained under a perpetual license, which is equivalent to buying a copy of a book. However, software products are sometimes available on a renewable basis, which is equivalent to borrowing a book from a rental library. Software products are often licensed for use on particular computers, as determined by their serial number, and/or for a maximum number of concurrent users. Upgrades, e.g., new versions of software products, may be periodically obtained. Many vendors, especially those of mainframe and minicomputer software, offer annual subscriptions to technical support services and product upgrades. These annual subscriptions are usually called "maintenance agreements". Vendors that do not offer subscriptions to such services usually offer product upgrades at extra costs.

For almost every installation, use of computer storage space is a major cost and a major concern. A significant amount of such storage space can be wasted by unused or under-used software products, obsolete versions of software products, and duplicate copies of software products.

In some cases, an installation may wish to restrict the use of particular software products to particular users, or to charge users for their use of particular products. An installation may wish to vary the charge for particular products based on when the products are used.

Managing and controlling the use of software products can be quite burdensome, especially for larger computer installations, and can have significant financial implications.

Several major concerns in controlling software products at an installation may occur. For example, concern over what software products are installed and where they are stored may come up. Also, whether there are duplicate copies of products and where are they located may be of concern. Questions concerning how much each software product being used, by whom and when may be important. Whether any software products are being used on a computer system for which they are not licensed is always a concern. Also of importance for licensed software is whether any software products are being used concurrently by more users than the number for which they are licensed. A question of importance to the licensee is whether any software products are being used by unauthorized users. From a maintenance point of view, it is important to know whether older versions of software products are still installed and whether they are still being used and by whom.

Once installed on a computer system, a software product consists primarily of a number of executable files known as programs, as well as possibly a number of non-executable files, such as data bases, profiles, etc. Whether executable or non-executable, files are identified by name along with other attributes, which are usually stored in the "table of contents" or "directory" of a storage device.

A number of products presently exist that inventory the software products that have been installed on a computer system. Such products typically have a data base that relates executable or non-executable file names to the product they came from. Such an inventorying product can survey the files on storage devices at an installation, identify the computer products to which they belong, and report what products are installed on the system in terms that users can understand.

Other products exist that provide job accounting functions, for example IBM SMF. Such products detect some forms of invocation of programs (e.g. jobs or job steps), and write records detailing such invocations.

Still other products exist that monitor usage of products that have been specifically written or modified to co-operate, and permit such monitoring by the monitoring product. Typically, the co-operating program would require code or a specialized module included within itself to "call" or "alert" the monitoring program to the fact that the co-operating program was invoked. In other words, the co-operating program must be modified to "inform" the monitoring program when the co-operating program is invoked. Such a monitoring product can then be used to ensure compliance with license conditions, such as number of concurrent usage.

Still other products exist that scan files for one or more specified unique sequences, e.g. text strings, and reporting back which files contain the sequence. In some of these products, if the sequence is found, the product can display the contents of the file surrounding the sequence.

The prior art does not allow an installation to automatically determine what products are being used without cooperation of the products being monitored and no matter how these products are invoked. Further, nothing in the art allows an installation to determine the library accessed or user or job accessing the products without cooperation from the products being monitored and no matter how the products are invoked.

The prior art has also not provided a means for automatically relating software inventory information to module usage information. In essence, the prior art has not provided a means for relating the modules that are used with the products they are associated with.

Furthermore, prior art has not provided a process by which information could be derived from modules at the installation that would help the installation determine the vendor and/or product of modules not already listed in a knowledge base.

SUMMARY OF THE INVENTION

It is an object of the present invention to provide a software product to detect, monitor, report on, and control the software products installed on a computer system and their actual usage. The present invention provides a method and apparatus for monitoring the usage of computer programs which includes automatically determining and recording each instance of actual usage of particular software products, as well as the identity of each user of those products. The present invention makes it possible for a company to cancel maintenance or rental on unused or under-used products or to uncover unauthorized usage of products or to uncover usage of prior obsolete versions of products or to identify patterns of usage. In general, the present invention allows a company to manage and control the usage of products at an installation. In addition, the present invention can be used to ensure that an installation complies with its software licenses, both in terms of not running product on computers for which it is not licensed and in terms of not exceeding the licensed number of concurrent users of a product.

The foregoing and other objects are achieved in accordance with the present invention by an apparatus for determining program usage on a computer having a plurality of storage devices. The apparatus comprises first, second and third memory means, the first memory means stores a list of module names and for each of the module names stores a product name associated with it. The apparatus further comprises a surveying means that surveys the storage devices of the computer system and stores the names of all program modules stored on the storage devices in the second memory means. The apparatus also comprises an associating means which stores an association between the product names stored in the first memory means and each of the module names stored in said second memory means. It also comprises a monitoring means for monitoring the invocations of modules on the computer system, the monitoring means stores invocation data relating to invocations of invoked modules in the third memory means. Further, the apparatus comprises a correlating means that correlates invocation data and the association between product names and module names. Finally, the apparatus comprises a reporting means that outputs the correlated data.

It will be clear to one of ordinary skill in the art that the memory means described herein may comprise a number of different files or storage areas.

There are several features of the present invention which further distinguish it from prior art. The present invention does not require that programs to be monitored are modified in any way, or written with the knowledge of how the monitoring function will work. Thus, the invention does not require any particular co-operation of the programs to be monitored. Additionally, using a knowledge base, or data base, that relates components name to product name, the present invention can report on usage by product, rather than simply .by component.

Other features and advantages of the present invention will become apparent from the following description of the invention which refers to the accompanying drawings.

DESCRIPTION OF THE PREFERRED EMBODIMENT

Figure 1:
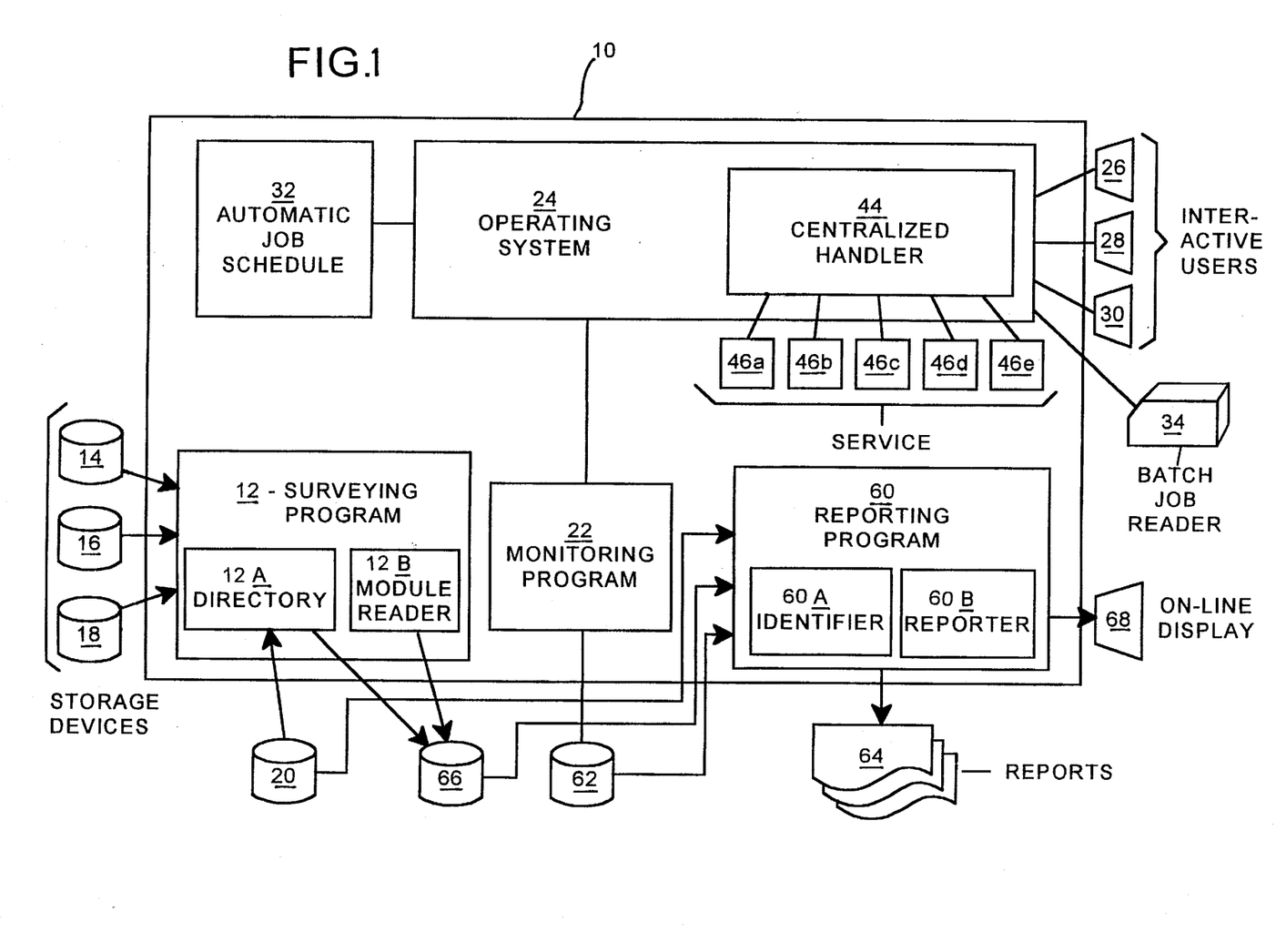
FIG. 1 is a block diagram illustrating a computing system for using the method of the present invention.

In FIG. 1, a computer system 10 is illustrated with its various portions illustrated in block form. As is conventional, the computer system 10 includes an operating system 24 and may include an automatic job scheduler 32. As is also conventional, the computer system 10 connects to peripheral devices, examples of which are shown in FIG. 1 and may include storage devices 14, 16 and 18, interactive user terminals 26, 28 and 30, and a batch reader 34. Not all of these peripheral devices are required to be present, and varying computer systems will have differing peripherals. The operating system 24 may contain a centralized handler 44 for the processing of service requests, where this is the case, services 45a–46e are usually also provided.

As used in this document, the term program or program module is used synonymously with executable file. Also as used herein, a "software product", or "product" is a related group of files comprising at least one module. A product may comprise additional modules and/or non-executable files. As used herein, product generally refers to a particular "version" of a given product.

The present invention provides a system for monitoring, tracking, and controlling the use of software products and the module or modules that comprise them. In a preferred embodiment, the invention includes a computer system having four main components, three of which are executable programs and one of which is an arrangement of information for use by those programs. The four main components are a surveying program, a monitoring program, a reporting program and a knowledge base.

Turning first to the surveying program 12. The surveying program 12 examines all the storage devices 14, 16 and 18 on computer system 10 to determine the program modules present. Optionally, the user can restrict surveying program 12 to examine, for example, only selected storage devices or selected libraries.

The surveying program 12 surveys storage devices 14, 16 and 18 when requested to do so by an operator (e.g. operator 26), any other program (e.g., the monitoring program 22), or periodically. Normally, an operator 26 invokes the surveying program 12 to survey storage devices 14, 16 and 18 when the present invention is first introduced into a computer system 10. An operator 26 may request the surveying program 12 to survey a single storage device, (e.g. storage device 14), for instance, because the operator 26 knows either that a software product has been installed on that storage device 14 or that a software product has been removed from that storage device 14 since the last time the survey program 12 surveyed that device 14.

Figure 3:
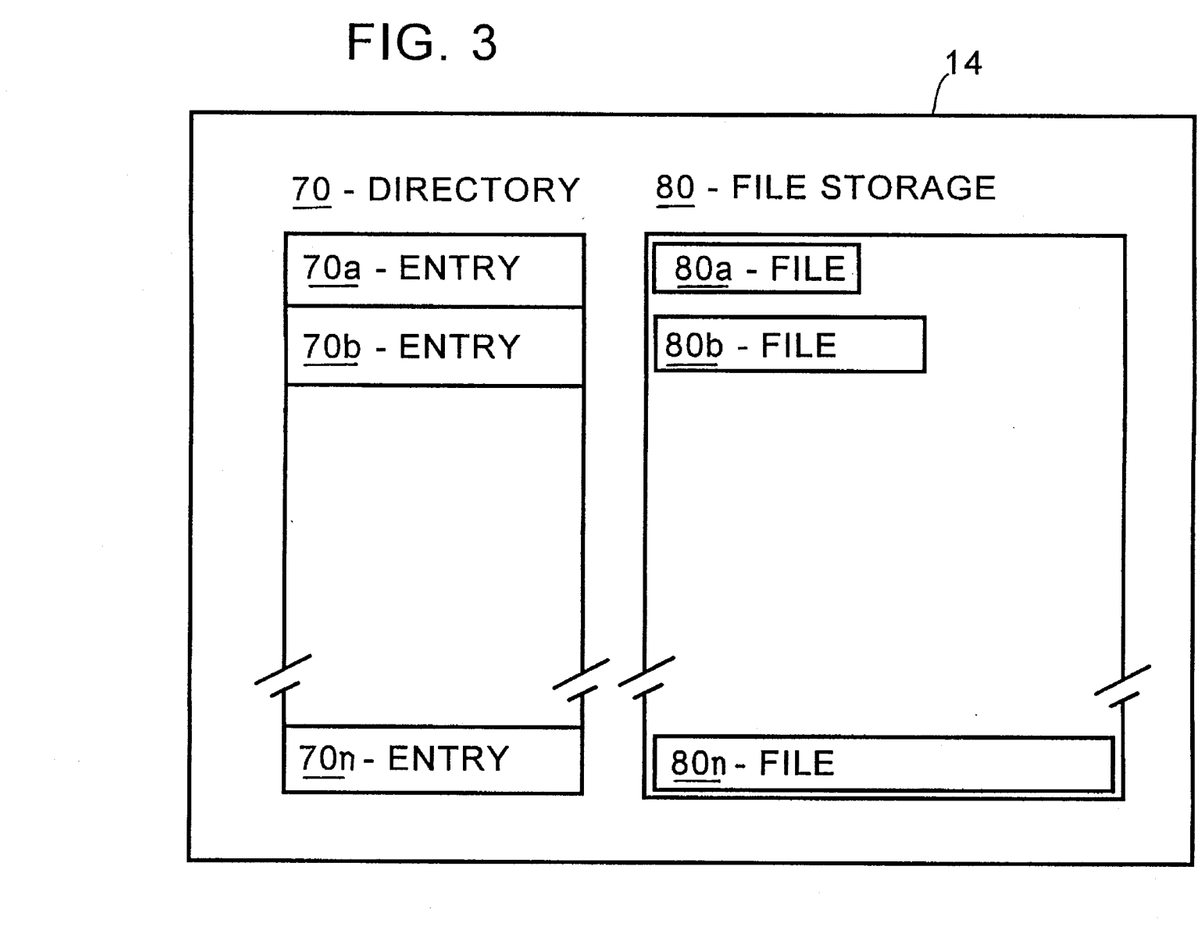
FIG. 3 is a block diagram illustrating an exemplary storage device that would be monitored using the present invention.

Typically, as shown in FIG. 3, a storage device 14, 16 and 18 has a "directory" or "table of contents" 70, and file space 80. In the illustration shown, entries 70a, 70b . . . 70n in the directory 70 are associated with files 80a, 80b . . . 80n respectively; files 80a, 80b . . . 80n are stored in the file space 80. Usually a directory entry, e.g. 70a, has associated therewith at least a file name (not shown) and a pointer to a file, e.g. 80a (not shown).

Referring back to FIG. 1, the surveying program 12 has two main sub-components. The first subcomponent is a directory surveyor 12A which examines the entries 70a, 70b . . . 70n in the directory 70 (see FIG. 2) to determine what program modules are present. The second sub-component is a file reader 12B that scans the contents of the files 80a, 80b . . . 80n not recognized on the basis of its directory entry 70a, 70b . . . 70n alone.

In a preferred embodiment, the directory surveyor 12A reads the directory 70 of the storage devices 14, 15 and 16, and ascertains which entries represent executable files on the basis of the entries 70a, 70b . . . 70n in the directory 70. How a particular operating system 24 designates an the entries 70a, 70b ... 70n as referring to program modules or non-executable files varies. An operating system 24 may indicate that a directory entry 70a, 70b ... 70n is associated with an program module by special flags, naming convention, or otherwise; this is familiar to a person skilled in the particular operating system 24. On PCs, for example, executable files have extensions of .EXE or .COM. (Of course, you can name a non-executable text file as if it were executable, so this is not completely reliable.) Under MVS (On IBM mainframes), executable files are recognized by the format in which they are stored. Again, this is not certain, but probabilistic; the program will occasionally misidentify a nonexecutable module as executable. Directory surveyor 12A then compares the names of the modules it finds (in directory 70) to module names represented in knowledge base 20, and records pertinent information in system configuration log 66 about the matches found.

It is important to note that the system configuration log 66, the knowledge base 20 and the recorded information log 62 are general collections of information. The information comprising each of these collections may be stored in a single file or may be stored a multiplicity of separate files and other memory areas. For example, in a preferred embodiment, the knowledge base 20 comprises the following types of information:

Module records: For each module, a module record contains the module name and the product ID of the product to which it belongs. (As indicated earlier, module names can be indicated in a generic fashion.)

Product records: For each product, a product record contains the product ID, the product name, the vendor ID, and (optionally) the product code used by the vendor for that product.

Vendor Records: For each vendor, a vendor record contains the vendor ID and the vendor name.

Vendor Product Code Records: For particular vendors that use recognizable product codes, for each such product, the product code and the corresponding product ID. For example, IBM is known to use product codes of the form "56nn–aaa" or "57nn–aaa", where "n" is any digit (0–9) and "a" is any (printable) character "5740-CB1" for example, is the COBOL OS/VS Compiler and Library (which, in a preferred embodiment has been assigned the product code "COBCLIB").

The knowledge base 20 can also be used to store information, such as the strings searched for by module reader 12B.

Further, in the knowledge base 20, modules can be represented through the use of a wild card, i.e. in a generic fashion. For example, a single module record for the name "ABC*" would be considered to match any actual name beginning with "ABC". The use of wild cards in a search is well known in the art.

The file reader 12B scans, or reads, the file 80a, 80b ... 80n associated with a directory entry 70a, 70b ... 70n and searches for copyright statements "COPYRIGHT", "COPR", or "(C)" (in either upper or lower case), recognized vendor names, recognized product names, and unique sequences or strings of text conforming to patterns recognized as product codes of particular vendors. As described above, this information, including copyright statements, vendor names, etc., which file reader 12B looks for may be stored in the knowledge base 20 or hard coded into the file reader 12B. In a preferred embodiment, the file reader 12B would scan only the modules 80a, 80b ... 80n associated with each directory entry 70a, 70b ... 70n which the directory surveyor 12A determined did not have a corresponding module name in the knowledge base 20. File reader 12B makes a record for later use regarding the results of its activities, including the identification of any file that is made, this record may be made in the system configuration log 66.

In another embodiment, file reader 12B would scan every module, however, where directory surveyor 12A has already determined that a file is an executable program and compared the entry with the knowledge base 20, file reader 12B could corroborate that information. In this embodiment, file reader 12B would additionally record information regarding corroboration or the lack thereof; this information could be recorded in system configuration log 66.

In a preferred embodiment, the surveying program 12 creates two types of records: one for modules identified by the directory surveyor 12A and one for modules identified by the file reader 12B. Both types of records contain module name, library name, volume name (i.e., the physical disk on which the library resides) and product ID. The latter record type, which are identified on the basis of a recognizable string, also contains data in the neighborhood of that string; the amount of said data that is contained therein can be varied, in a preferred embodiment, it is 200 bytes of data.

Where a module name is not represented in the knowledge base 20, but the vendor has been recognized because of information found by the file reader 12B, an flag or indicator is substituted for the module name in the record. In this case, the module will appear on reports listed as being an unknown product of that vendor.

The second major component of the present invention is a monitoring program 22. The monitoring program 22 records pertinent information in a recorded information log 62 when certain events occur.

Typically, for each module used, the information recorded by the monitor consists of the module name, the library name from which it was loaded, the volume of the library, the product ID, the job name using the module, the step name using the module, the job start date and time, the job number assigned by the job scheduling/managing program, and the user ID. If the module is not loaded from a library but is resident, an indication of this is recorded. Depending on the operating system, other relevant information may be available, and is recorded, and some of this information may be unavailable. For compactness, this information may be reorganized. In a preferred embodiment, one record is created containing all the job-related information (start date and time, job number, etc.), another record is created containing step related information (step name, etc.), and another record is created for each module used during that step. Later, in the reporting phase, this information is reorganized as appropriate.

In a preferred embodiment, program execution would be monitored as such an event, thus, when a program module is executed, pertinent information is recorded by the monitoring program 22.

Among many other functions the operating system performs, it accepts instructions as input from a variety of sources including interactive users 26, 28, 30, automated job schedulers 32, batch job readers 34, and other programs. From these many sources of instructions, the operating system constructs one or more instruction streams 40 (see FIG. 2) which are lists of instructions to execute sequentially. In a multi-processing, multi-threading, or multi-tasking environment, several instruction streams may be operated upon concurrently.

Figure 2:
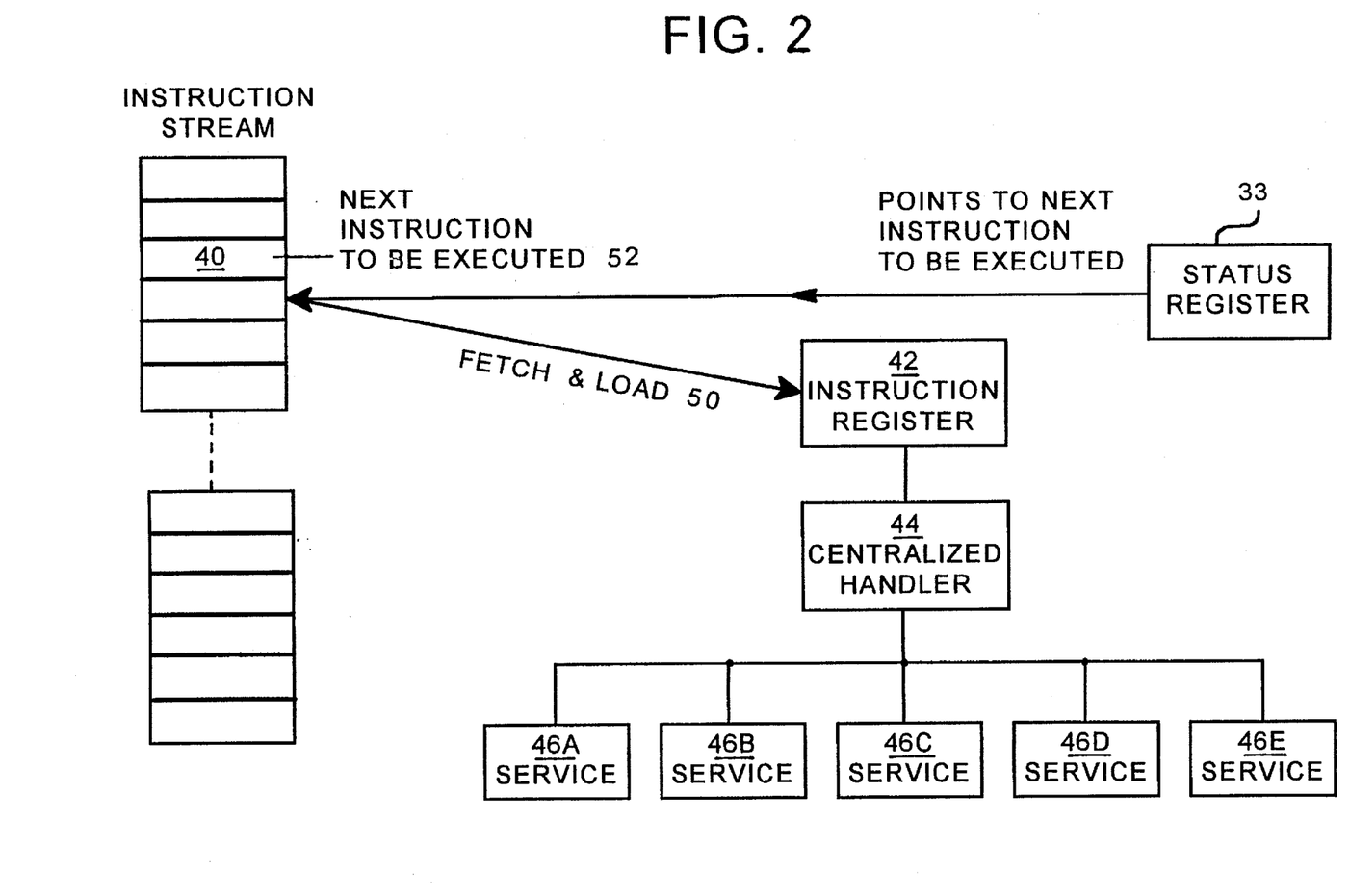
FIG. 2 is a block diagram illustrating a portion of the computing system of FIG. 1.

Referring now to FIG. 2, typically, the execution of a instruction consists of several steps. When operating system 24 is ready to the next instruction in an instruction stream, it consults a status register 38, a special storage location in memory indicating the location of the next instruction 40. It then fetches and loads the next instruction register 42 used to hold the instruction to be executed.

Depending on the type of instruction, the execution can involve many different things. Typically, certain operations are considered privileged, and are performed by sub-programs of operating system 24 or service routines on behalf of the programs requesting them. Typically, all such requests for system services via service routines are handled by one centralized handler 44, and are then routed to the appropriate routine 46a–46e for actual execution. Among the service routines that are typically provided are routines that cause another module or other collection of instructions to be executed. For example, in an IBM MVS system, such instructions are LINK, LOAD, LXTL and ATTACH. In some cases, the operating system may provide a system service allowing a program to monitor which such service routines are being executed.

In some operating systems a system service (such as loading a program) is invoked directly. In other words, the requester (usually a user 26, 28, 30, an automated job scheduler 32, a batch reader 34 or another program) invokes the service 46a–46e to be performed.

It is critical that the monitoring program 22 is able to "see" the occurrence of the events it is monitoring. Depending on the particulars of computer 10 and operating system 24, there are a number of ways that the monitoring program could "see" the pertinent events.

In a preferred embodiment, the monitoring program 22 can monitor, or "see," a system service requests as an event regardless of whether the particular operating system 24 permits services to be invoked directly or whether they are invoked through a centralized handler 44. The monitoring program 22 is introduced at one or more appropriate points of the operation of the operating system 24 so that every event desired to be monitored can be known to, or "seen" by, the program. Techniques for introducing, or "hooking", an additional set of instructions into an existing program or operating system 24 are familiar to those skilled in the art. These may include techniques such as renaming an existing module and substituting a module with the original name or dynamically changing an address vector to point to the new program, retaining the address of the original program so it can be invoked after the new program competes its operations.

Where the operating system 24 has a centralized handler 44, the centralized handler 44 often provides a "hooks" to allow a monitoring program 22 to "see" events. "Hooks" will differ slightly in implementation and use depending on the operating system 24. Often an operating system 24 allows the monitoring program 22 to execute prior to some portion, or all of, the centralized handler 44 and potentially circumvent performance of the service 46a–46e, or set a flag which would cause the handler 44 to terminate execution of the requested service 46a–46e. The appropriate points to introduce the monitoring program 22 may include the instruction fetch and load operation, illustrated generally at 50, the execution of the instruction, illustrated generally at 52, the execution of the centralized service routine handler, illustrated generally at 44, or the execution of the individual service routine, illustrated generally at 46. For example, in an IBM, MVS system, it could be appropriate to "hook" into the execution of the centralized service routine handler, using a technique known as "SVC interception."

Where there is no centralized handler 44, the monitoring program 22 would "hook" into numerous places in the operating system, such as program loading and termination calls. The places to "hook" into, of course, depends upon the events to be monitored. Thus, where there is no centralized handler 44, monitoring program 22 would "hook" into appropriate points of the operating system 24 which would likely include the execution of the individual service routines, for instance: a program loader, in the case where program "load" is being monitored.

Referring back to FIG. 1, the third main component of the present invention is the reporting program 60 which sorts, correlates, consolidates, summarizes, formats and outputs reports 64 based upon the information gathered by surveying program 12 and monitoring program 22, e.g. the information stored in system configuration log 66 and recorded information log 62 respectively.

In a preferred embodiment, reporting program 60 can, using the information stored in system configuration log 66 and recorded information log 62, produce output reports 64. To produce reports, reporting program 60 correlates the recorded information regarding events that have occurred and surveyed products on the computer system and can produce an almost infinite variety of reports. For instance, after correlating this information, reporting program 60 could produce reports: listing the products that are installed in duplicate along with a list of users which are accessing each copy; listing the number of accessed per unit time for any product; listing products which are routinely denied access due to the number of licenses; listing products that are accessed (or attempted) by unauthorized users; and listing all versions of a product currently installed, along with a list of the number of users that utilize each. Of course, many other reports can be made using this information; once the event data is correlated with the associated software product, the analysis and assembly of the remainder of this information into useful reports would be familiar to one of skill in the art.

In a preferred embodiment, the reporting program 60 comprises two components, the identifier 60A and the reporter 60B. The identifier 60A does the most of the correlating, consolidating and filtering that would be necessary to produce any report. (The identifier, for example, associates the product ID code and module records and searches for various text strings stored for records identified on the basis of a recognizable string.) The reporter 60B performs only the final stages of sorting, consolidating and formatting. The fourth main component of the present invention is the knowledge base 20 which comprises module names and the relationship of the modules to products with which they are associated. Knowledge base 20 may contain other information, such as product names, vendor names, vendors products numbers, etc.

At a typical computer installation, the present invention is loaded into the computer system 10 and the surveying program 12 is run. Once this has been done, the monitoring program 22 may be run continuously or for a sampling period. (Note that it is typical, but not required, that the surveying program 12 is run prior to running the monitoring program 22.) Once the surveying program has surveyed the storage devices 14, 16 and 18 and the monitoring program 22 has run for at least a sample period, the reporting program 60 may be run to report on system usage during the sampling period.

Now turning to an examination of each component in more detail, in typical usage, the surveying program 12 is executed so that it may examine the storage devices 14, 16 and 18 on computer system 10 and determine what executable files are present. Using the information contained in knowledge base 20, surveying program 12 determines which products are installed on computer system 10. This information is recorded in system configuration log 66 for use at a later time and may be optionally presented to the user in printed format, on-line display, or output in some other suitable form 64.

In a preferred embodiment the information is presented to the user at an on-line display 68 where the information may be searched, scanned, and otherwise manipulated. This information may be presented to the user by surveying program 12 itself, by reporting program 60, or by another program. Programs to display and manipulate information are well known in the art.

If the operating system 24 or an extension thereto were to so provide, the monitoring program 22 could be configured to monitor the installation of new software as an event. When monitoring program 22 detects that new software has been installed, it could invoke surveying program 12. By so invoking surveying program 12, the information regarding installed products would be kept up to date automatically.

Similarly, if the operating system 24 or an extension thereto were to so provide, the monitoring program 22 could be configured to monitor the deletion of software as an event. Upon detecting this event, monitoring program could invoke surveying program 12, similarly keeping the information regarding installed products current.

The monitoring program 22 may be activated for a sample period, or it may be operated constantly. Typically, when used to monitor software licenses, user accesses and the like, the monitoring program 22 would normally be operated constantly. On the other hand, when used to accumulate information regarding utilization of various products and versions, and to determine usage patterns, the monitoring program 22 may be activated for a sample period.

The length of the sample period in which to operate the monitoring program 22 depends upon the particular characteristics of the computer system 10 and the operating system 24 upon which the monitoring program is being run. In a preferred embodiment, such a sample period would be between a week and about two months. It is, however, important to note that certain products may only be executed, e.g., annually. Where this is the case, the monitoring program 22 would not "see" the activation of these products unless its sample period included the time when at least one of its modules were executed.

The monitoring program 22 may be used to monitor a sample period, and produce a report reflecting system usage. To carry out the sample period monitoring, once monitoring program 22 has run for a period deemed sufficient by the user, the information obtained by it, and stored in recorded information log 62, can be processed by reporting program 60 and presented to the user in a usable format. For example, a user may request a listing of a particular product indicating how many times any module of the product was executed during the period monitored. To produce that report, reporting program 60 would check the system configuration log 66 to determine which modules are associated with a given product, thereafter, the recorded information log is scanned for execution events for the module names associated with the product occurring during the period in question. Total executions may be maintained in memory and the information can then be presented to the user in printed format, on-line display, or some other suitable form 64. In a preferred embodiment, where the information is presented for on-line display, the user can be permitted to search, scan, and otherwise manipulate it.

Once monitoring program 22 is activated on the system, when each monitored event occurs, information relevant to that event is recorded in the recorded information log 62. Typically, this information includes the time and date, the name of the file being executed and the identity of the user, job, or program that initiated the file. Also included can be the location from which the program was obtained, for example, the program library or area of main storage. This recorded information log 62 may be recorded in main storage or in auxiliary storage such as magnetic tape or disk, printed out, etc. In a preferred embodiment, the recorded information log 62 would comprise recorded information in main storage and recorded information written to auxiliary storage. In a preferred embodiment, monitoring program 22, would periodically write a cached portion of the recorded information log 62 in main storage to the recorded information log 62 in auxiliary storage.

The monitoring program 22 may, under the control of user specifications, restrict its attention to certain modules, certain types of modules, modules obtained from certain locations, certain products, certain kinds of events, certain times of day, or days of the week, etc.

The monitoring program 22 can also be used to ensure compliance with licenses, both in terms of whether a given computer is licensed to use a given software product and whether the licensed number of users on a given computer has been exceeded. In order to monitor this type of information, it is preferred that monitoring program 22 is run continuously, rather than for sampling period. When used to ensure compliance with licenses, monitoring program 22 is supplied with a list of software products to be monitored, optionally this list may include information regarding which computers are authorized to run each product and the number of concurrent users permitted. In a preferred embodiment, monitoring program 22 checks the list whenever an event occurs which would require authorization, e.g. a program execution. If monitoring program 22 determines that authorization is to be denied, it causes the event to fail, for example, by "abending" rather than permitting execution of a program in the case of program execution. Monitoring program 22 may additionally issuing a warning message and would, in a preferred embodiment, write an entry in recorded information log 62.

When determining whether a particular computer is authorized, monitoring program 22 may obtain identifying information as to which computer originated the request to execute the program in a similar fashion as it obtains other event information. In the case of checking the number of concurrent users, monitoring program 22 would maintain an individual count for each program to be monitored, incrementing the count each time it allows the program to be initiated and decrementing it each time the task (job, address space, etc.) that initiated the request terminates. In this case, monitoring program 22 would also monitor such terminating events.

A number of variations and enhancements follow from the basic invention. For example, surveying program 12, monitoring program 22 and reporting program 60 can be directed to survey, monitor, and report only a user-specified list of products, or can be confined in their operations in other ways. Also for example, knowledge base 20 can be supplemented by information provided by the user. Further, the surveying program 12 can make use of other data bases it finds on the system to relate program module names to product names.

A possible major enhancement to the basic invention applies to networks of computers. For example, a number of PC computers or microcomputers can be linked. In that case, monitoring program 12, or a separate program, can automate the periodic downloading and execution of surveying program 12 and/or monitoring program 22 on the computers, as well as the periodic uploading of the resulting information. This could be carried out with PC computers or microcomputers linked to a mainframe computer, or alternatively, in a peer computer network. Thus, automatically or at user request from one computer, information can be gathered about products installed on a number of other computers, as well as information about their actual usage.

Further, monitoring program 22 can be enhanced to monitor the execution of transactions that run under the control of a teleprocessing monitor such as CICS, IMS, and INTERCOMM. A teleprocessing monitor provides an environment in which on-line applications are run concurrently. Such applications, known as transactions, are typically executed from within the teleprocessing monitor without using the system services used to recognize execution of ordinary files. This enhancement involves analyzing each teleprocessing monitor that the monitoring program is to support, identifying the mechanism by which the teleprocessing monitor invokes a transaction and, as discussed above, introducing additional instructions at the appropriate points to capture and write out the required information.

Figure 4:
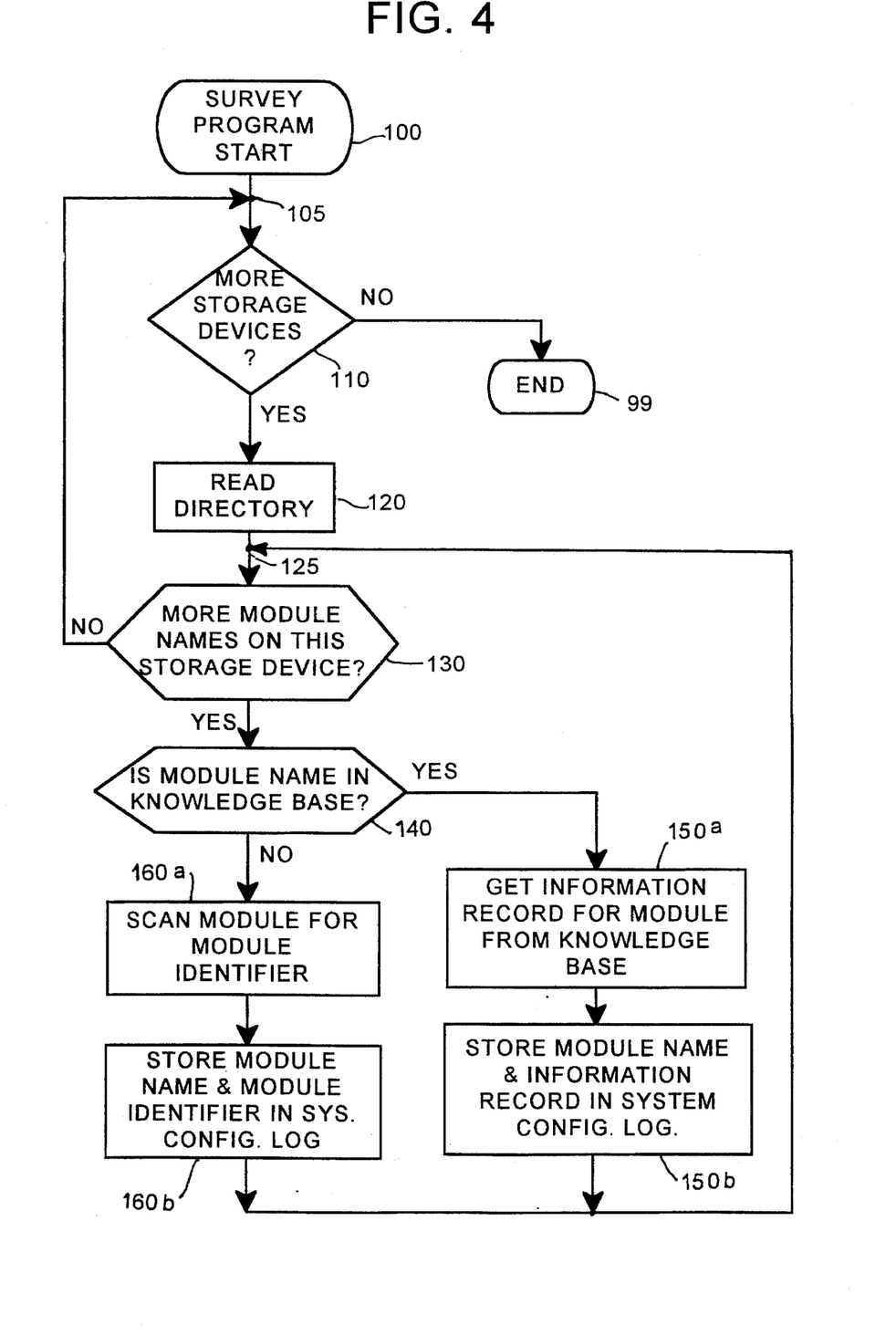
FIG. 4 is a flow chart illustrating the flow of the Survey Program.

Turning now to the flow chart in FIG. 4 which describes the flow of the survey program (12, FIG. 1). The survey program 12 is initiated at 100. Once initiated, the survey program at 110 determines whether there is a storage device (14, 16 and 18, FIG. 1) that requires surveying. If there is a storage devices that requires surveying, survey program 12, at 120 reads the directory or directories of that storage device. If there are no storage devices which require surveying, the survey program 12 terminates at 199.

Survey program 12 then, at 130 reviews the directory or directories of the storage device to determine whether there are modules therein which have not been recorded in the system configuration log (66, FIG. 1). If it finds that there fare no such modules, survey program 12 returns to location 105, so that it may proceed to the next storage device. If, however, there are modules which have not been "surveyed" by survey program 12, at 140 survey program 12 searches the knowledge base for the module's name.

If the module's name is found in the knowledge base, at 150a, survey program 12 gets the information record stored in the knowledge base that is associated with the module's name. Subsequently, at 150b the module name and the associated information record are written to the system configuration log 66. If, however, the module's name is not located in the knowledge base, at 160a the module itself is scanned for a module identifier. As discussed above, a module identifier could include a product code or copyright found in the module itself, among other identifiers. Once the module identifier is located, at 160b, the module name and its associated identifier are written to the system configuration log 66. Having stored the appropriate information in the system configuration log 66, the survey program proceeds to location 125 so that it may determine whether additional "surveying" of modules on this storage device is required.

Figure 5:
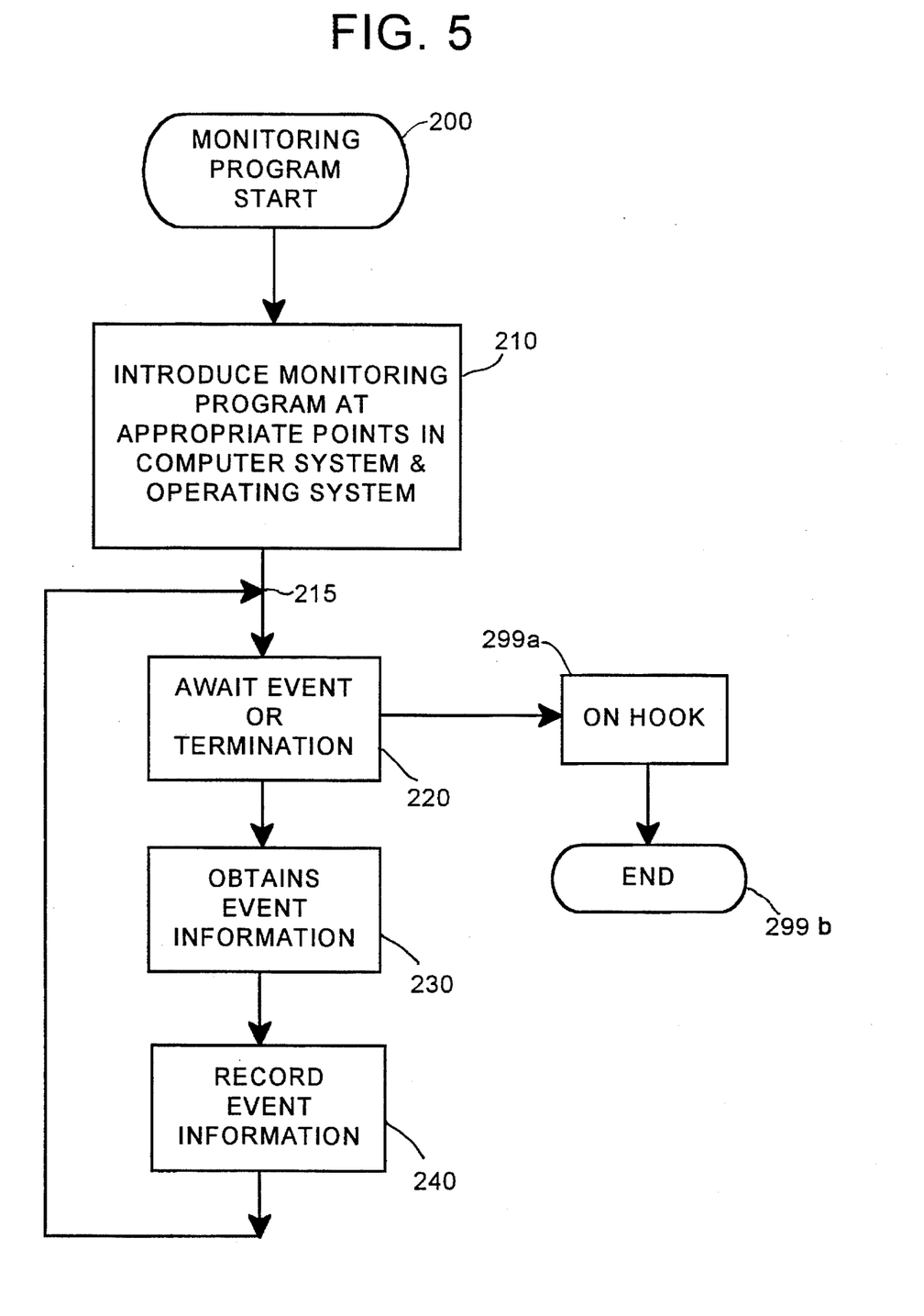
FIG. 5 is a flow chart illustrating the flow of the Monitoring Program.

Turning now to the flow chart in FIG. 5 which describes the flow of the monitoring program (22, FIG. 1). The monitoring program 22 is initiated at 200. Once initiated, the monitoring program, at 210 introduces itself at the appropriate points of the computer system 10 and the operating system 24. As discussed above, these appropriate points depend upon the type of computer system, operating system into which they are introduced, and also depend upon the events that will be monitored.

Once monitoring program 22 is introduced into the computer system 10 and operating system 24, at 220, it awaits an event. If it receives an instruction to terminate, at 299a, it takes appropriate actions to remove itself from the points it had introduced itself to at 210, and then, at 299b, it terminates.

When monitoring program 22 receives indication that one of its monitored events has occurred, at 230, it obtains event information. At 240, this event information is recorded in the event information log (62, FIG. 1), and the program goes to location 215 to await another event.

It should be noted that monitoring program 22 could introduce itself at 210 to receive many types of events. Once an event is received, at 220, monitoring program 22 could determine whether the event is the type it will record in step 240; if it is such an event, monitoring program 22 may proceed to 230 and obtain event information, if it is not such an event, monitoring program 22 may ignore the event, remain at 220 and await another event. This latter method of filtering events by the monitoring program 22 is useful because it permits dynamic changes in the events that are monitored without additional introduction into points in computer system 10 and operating system 24.

Figure 6:
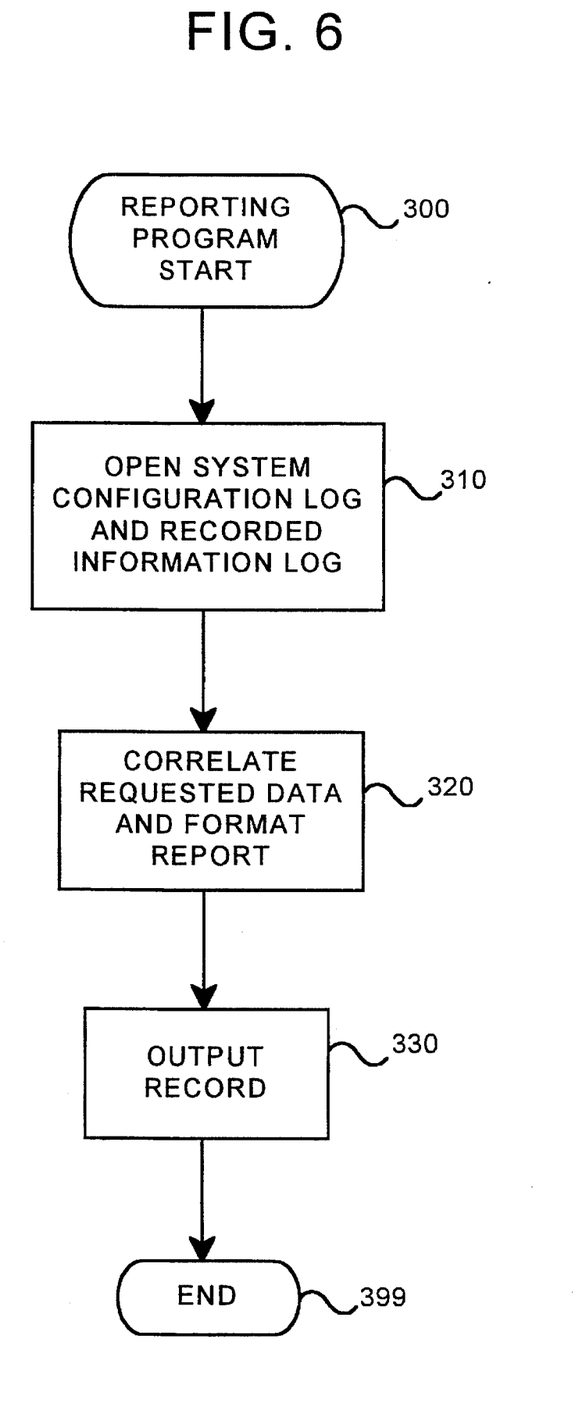
FIG. 6 is a flow chart illustrating the flow of the Reporting Program.

Turning now to the flow chart in FIG. 6 which describes the flow of the reporting program (60, FIG. 1). The reporting program 60 is initiated at 300. Once initiated, the reporting program at 310 obtains access to both the system configuration log (66, FIG. 1) and the recorded information log (62, FIG. 1). Subsequently, at 320, reporting program 60 correlates at least event information in the recorded information log 62 and product associations in the system configuration log 66.

Also at 320, reporting program 60 formats the correlated data, and other desired data for output as a report. At 330, the report is output. Once the report is output, at 399, reporting program 60 terminates.

In a preferred embodiment, reporting program 60 outputs the report to a user on-line. Where this is done, it is desirable that the user be able to reformat the report on demand. The on-line input of such a demand and corresponding on-line output of data is well known in the art. Further, in a preferred embodiment, additional correlations of data should be available to the user on demand.

Although the present invention has been described in relation to particular embodiment thereof, many other variations and modifications and other uses will be apparent to those skilled in the art.

What is claimed is:

1. Apparatus for determining program usage on a computer having a plurality of storage devices, said apparatus comprising:

first, second and third memory means;

said first memory means storing a list of program module names of program modules and for each of said program module names storing a product name associated therewith;

surveying means that surveys the storage devices and stores in said second memory means module names of modules stored on said storage devices;

associating means that stores in said second memory means an association between the product names stored in said first memory means and each of said module names stored in said second memory means;

monitoring means that monitors invocations of said modules on said computer system and stores in said third memory means invocation data relating to said invocations of said modules;

correlating means that correlates said invocation data stored in said third memory means and said association between the product names and each of said module names stored in said second memory means; and reporting means that outputs the data correlated by said correlating means.

2. Apparatus as claimed in claim 1, wherein said monitoring means additionally monitors termination of said modules on said computer system and additionally stores in said third memory means termination data relating to said terminations of said terminated modules.

3. Apparatus as claimed in claim 1, wherein said monitoring means monitors invocations by intercepting service requests.

4. Apparatus as claimed in claim 1, wherein said monitoring means monitors invocations using hooked vectors.

5. Apparatus as claimed in claim 1 wherein said monitoring means monitors invocations by using a set of additional instructions inserted into an existing program or operating system.

6. Apparatus as claimed in claim 1, wherein said monitoring means stores additional invocation data including the name of at least one of:

a name associated with said module;

a volume associated with said module, a computer system associated with said invocation, a user associated with said invocation, a job associated with said invocation, a library from which said module was obtained, and an area of main storage from which said module was obtained.

7. Apparatus as claimed in claim 1, wherein said monitoring means stores additional invocation data including at least one of:

a time associated with the initiation of the invocation, a date associated with the initiation of the invocation.

8. Method as claimed in claim 1, wherein said step of monitoring monitors invocations using SVC interception.

9. Apparatus for inventorying modules stored on a storage device, each of said modules having a name, said apparatus comprising:

first memory means for storing a knowledge base, said knowledge base including data representative of a plurality of module names and a plurality of information records, each of said information records being associated by said first memory means to at least one module name;

second memory means;

means for storing in said second memory means a plurality of the module names stored on the storage device;

means for scanning said first memory means to locate said information record associated with each said module name stored in said second memory means;

means for storing said information record in said second memory means;

means for relating each said information record stored in said second memory means with at least one module name stored in said second memory means;

means for scanning at least the modules corresponding to each of the module names stored in said second memory means and not stored in said first memory means to locate a module identifier associated therewith;

means for storing said module identifier in said second memory means; and means for relating each said module identifier stored in said second memory means with at least one module name stored in said second memory means.

10. Method for determining program usage on a computer having a plurality of storage devices, said method comprising the steps of:

storing in a first memory means a list of program module names of program modules and for each of said program module names storing a product name associated therewith;

surveying the storage devices and storing in a second memory means module names of modules stored on said storage devices;

storing in said second memory means an association between the product names stored in said first memory means and each of said module names stored in said second memory means;

monitoring invocations of said modules on said computer system and storing in a third memory means invocation data relating to said invocations of said modules;

correlating said invocation data stored in said third memory means and said association between the product names and each of said module names stored in said second memory means; and outputting the correlation of said invocation data stored in said third memory means and said association between the product names and each of said module names stored in said second memory means.

11. Method as claimed in claim 10, wherein said step of monitoring additionally monitors termination of said modules on said computer system and additionally stores in said third memory means termination data relating to said terminations of said terminated modules.

12. Method as claimed in claim 10, wherein said step of monitoring monitors invocations-by intercepting service requests.

13. Method as claimed in claim 10, wherein said step of monitoring monitors invocations using SVC interception.

14. Method as claimed in claim 10, wherein said step of monitoring monitors invocations using hooked vectors.

15. Method as claimed in claim 10, wherein said step of monitoring stores additional invocation data including the name of at least one of:

a name associated with said module;

a volume associated with said module, a computer system associated with said invocation, a user associated with said invocation, a job associated with said invocation, a library from which said module was obtained, and an area of main storage from which said module was obtained.

16. Method as claimed in claim 10, wherein said step of monitoring stores additional invocation data including at least one of:

a time associated with the initiation of the invocation, a date associated with the initiation of the invocation.

17. Method as claimed in claim 10, wherein said step of monitoring monitors invocations using a set of additional instructions inserted into an existing program or operating system.

18. Method for inventorying modules stored on a storage device of a computer system, each of said modules having a name, the computer system having first memory means for storing a knowledge base, said knowledge base including data representative of a plurality module names and a plurality of information records, each of the information records being associated by the first memory means to at least one module name, the computer system additionally comprising second memory means, said method for inventorying comprising the steps of:

storing in the second memory a plurality of the module names stored on the storage device;

scanning the first memory means to locate the information records associated with each of the module names stored in the second memory means, and storing each of the information records in the second memory means, and associating each of the information records with at least one module name stored in said second memory means;

scanning at least each of the modules corresponding to each of the module names stored in the second memory means and not stored in the first memory means to locate a module identifier for each said corresponding module, and storing each of said module identifiers in the second memory means, and associating each of the module identifiers with at least one module name stored in said second memory means.

\* \* \* \* \*